United States Patent [19]
Penot

[11] Patent Number: 4,830,400
[45] Date of Patent: May 16, 1989

[54] REAR AXLE FOR MOTOR VEHICLES
[75] Inventor: Jean Penot, Villejuif, France
[73] Assignees: Automobiles Peugeot, Paris; Automobiles Citroen, Neuilly sur Seine, both of France
[21] Appl. No.: 56,601
[22] Filed: May 29, 1987
[30] Foreign Application Priority Data Jun. 10, 1986 [FR] France ................. 86 08620

[51] Int. Cl.⁴ ............................................. B60B 35/04
[52] U.S. Cl. ................. 280/723; 301/124 R; 180/75
[58] Field of Search ............... 180/75; 280/723, 689, 280/665, 772, 723, 695, 700, 719; 267/273; 301/124 R

[56] References Cited

U.S. PATENT DOCUMENTS

| 312,502 | 2/1885 | Parker | 301/124 R |
|---|---|---|---|
| 428,291 | 5/1890 | Stuart | 301/124 R |
| 2,132,725 | 10/1938 | Davis | 301/124 R |
| 2,148,714 | 2/1939 | Urschel | 301/124 R |
| 2,218,127 | 10/1940 | Urschel | 301/124 R |
| 3,175,842 | 3/1965 | Rogers | 280/723 |
| 3,844,583 | 10/1974 | Sakow et al. | 280/721 |
| 3,896,895 | 7/1975 | Schultz et al. | 180/75 |
| 3,966,270 | 6/1976 | Braun | 301/124 R |
| 4,343,375 | 8/1982 | Manning | 180/75 |
| 4,429,899 | 2/1984 | Ohno et al. | 280/689 |

FOREIGN PATENT DOCUMENTS 1239096 7/1960 France ........................ 301/124 R Primary Examiner—Richard A. Bertsch
Attorney, Agent, or Firm—Herbert Dubno

[57] ABSTRACT

The present invention provides a rear axle having swinging wheel arms connected together by a semi-rigid cross piece. The cross piece has a Y shaped section whose lower leg is offset so that the plane of symmetry passing through this leg also passes through the straight line connecting together the points of contact of the wheels with the ground.

2 Claims, 1 Drawing Sheet

REAR AXLE FOR MOTOR VEHICLES

BACKGROUND OF THE INVENTION

Axles are known which include swinging wheel arms connected together by semirigid cross pieces having a section for example in the form of a cross or a V; generally the axles are formed from several metal strips welded together.

The present invention provides a rear axle of this kind which has optimum rigidity, in particular high rigidity in a horizontal plane and in a vertical plane and low rigidity with respect to torsional stress.

SUMMARY OF THE INVENTION

The axle of the invention is novel in that the cross piece has a Y shaped section whose lower leg is oriented so that the plane of symmetry passing through this leg also passes through the straight line connecting together the contact points of the wheels with the ground.

In an advantageous embodiment of the invention, the axle is made of a single piece and is formed by deforming a tube of circular section.

BRIEF DESCRIPTION OF THE DRAWING

One embodiment of the axle of the invention is described hereafter by way of non limitative example with reference to the accompanying drawing in which.

DESCRIPTION OF THE PREFERRED EMBODIMENT

Figures 1, 2:
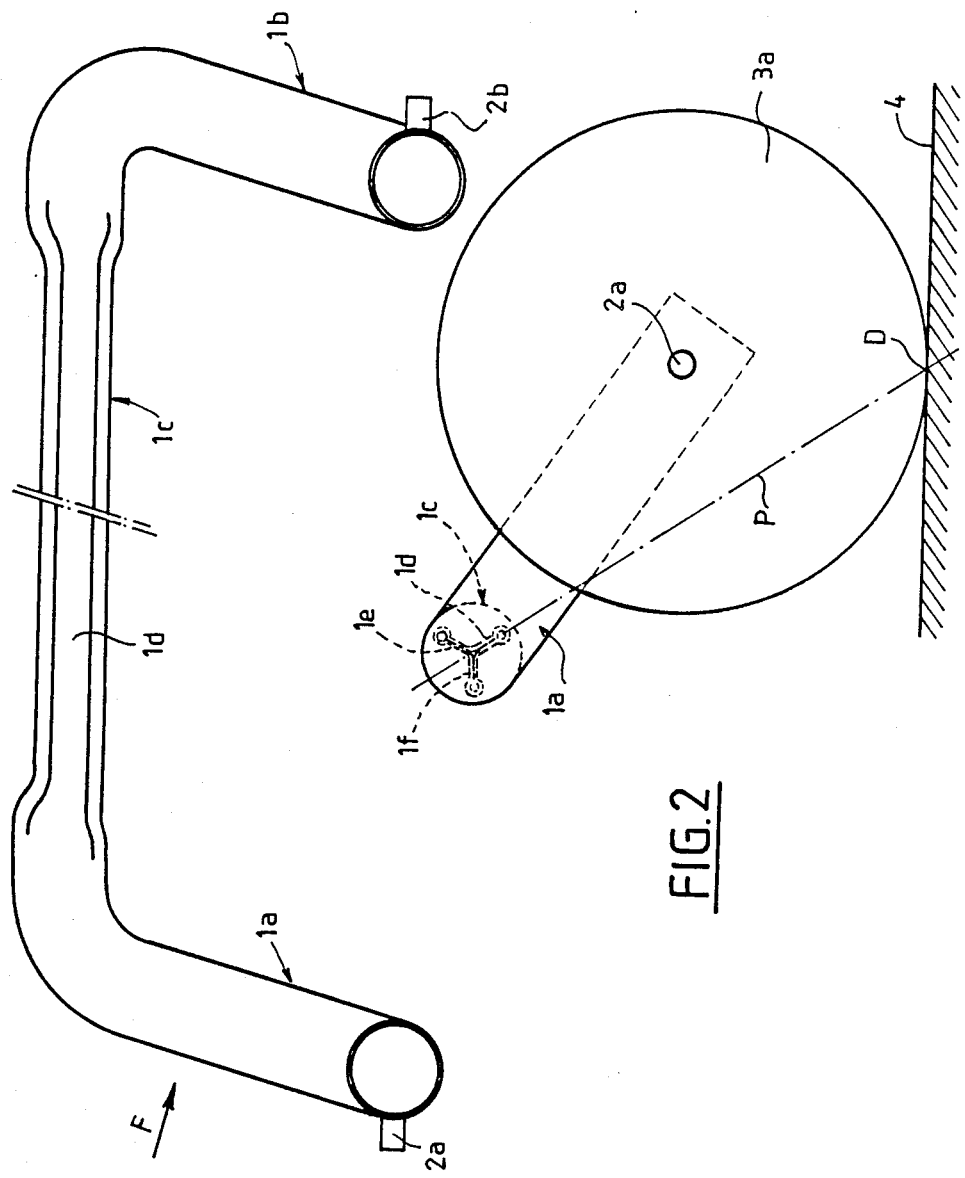
FIG. 1 is a perspective view of the axle.
FIG. 2 is a side view in the direction of arrow F of FIG. 1.

As shown in the drawing, the rear axle includes two swinging wheel arms $1a$ and $1b$ connected together by a semirigid cross piece $1c$. Each of the arms has a shaft $2a$ or $2b$ for a wheel such as the wheel $3a$.

The axle is made in one piece from a tube of circular section. The cross piece $1c$ has a Y shaped section obtained by deformation of the tube. The lower leg $1d$ of this section is oriented so that the plane of symmetry P passing through this leg also passes through the straight line D joining the points of contact of the wheels with the ground $4$, that is to say through the vertical projections of shafts $2a$ and $2b$ on the ground plane.

The Y section of cross piece $1c$, with respect to a cross shaped section of equivalent mass, increases the moment of inertia under flexion of this cross piece and reduces its moment of inertia under torsion. Because of the orientation of the section, the maximum flexion modulus is obtained in the zones working under traction, under the effect of the transverse forces which are exerted on the wheels in the direction of the straight line D, that is to say in the upper legs $1e$ and $1f$ of the cross piece; the flexional stress is thus minimum. Cross piece $1c$ is very rigid in the horizontal plane as well as in the vertical plane; the deformations corresponding respectively to a spread variation and to a rake variation are thus relatively small.

In addition, since the whole cross piece works under torsion, the rigidity of the axle is inversely proportional to the length of the working part. It is therefore easy to increase the roll restraint by reducing this length.

It goes without saying, that the present invention must not be considered as limited to the embodiment described and shown but on the contrary covers all variants thereof.

What is claimed is:

1. A rear axle assembly, comprising:
   a substantially rectilinear crosspiece of a Y-shaped cross section defined by three angularly adjoining legs. one of said legs being lower than the other two legs;
   respective arms formed on opposite ends of said crosspiece;
   means defining respective wheel axes on said arms; and
   respective wheels mounted on said arms for rotation about the respective wheel axes and engageable with a ground surface at a contact point, the contact points of said wheels upon said ground surface defining a line, said one of said legs being so oriented that a plane of symmetry through said one of said legs includes said line.

2. The rear axle assembly defined in claim 1 wherein said arms constitute parts of a single tubular member forming said crosspiece and said Y-shaped section is deformed from said member.

* * * * *